(12) United States Patent
Kuo et al.

(10) Patent No.: US 10,289,245 B2
(45) Date of Patent: May 14, 2019

(54) TOUCH APPARATUS, TOUCH CONTROLLER THEREOF AND NOISE DETECTION METHOD

(71) Applicant: Novatek Microelectronics Corp., Hsinchu (TW)

(72) Inventors: Hung-Cheng Kuo, Hsinchu (TW); Po-Wei Chen, Hsinchu County (TW); Chun-Hung Chen, Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 416 days.

(21) Appl. No.: 14/607,031

(22) Filed: Jan. 27, 2015

(65) Prior Publication Data

US 2015/0338992 A1 Nov. 26, 2015

Related U.S. Application Data

(63) Continuation-in-part of application No. 14/285,604, filed on May 22, 2014.

(Continued)

(30) Foreign Application Priority Data

Oct. 31, 2014 (TW) .............................. 103137836 A

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ...... G06F 3/044; G06F 3/0418; G06F 3/0416; G06F 3/0412; G06F 3/041;
(Continued)

(56) References Cited

U.S. PATENT DOCUMENTS

| 7,986,193 | B2 * | 7/2011 | Krah | ...................... | G06F 3/0418 |
| | | | | | 331/17 |
| 8,508,504 | B2 * | 8/2013 | Mo | ........................ | G06F 3/0418 |
| | | | | | 345/173 |
| 8,736,563 | B2 * | 5/2014 | Noguchi | ............... | G06F 3/0412 |
| | | | | | 178/18.02 |

(Continued)

FOREIGN PATENT DOCUMENTS

| CN | 101296352 | 10/2008 |
| CN | 101527309 | 9/2009 |

(Continued)

OTHER PUBLICATIONS

"Office Action of Taiwan Counterpart Application", dated Mar. 18, 2016, p. 1-3.

(Continued)

*Primary Examiner* — Aneeta Yodichkas
(74) *Attorney, Agent, or Firm* — JCIPRNET

(57) ABSTRACT

A noise detection method including the following steps is provided. During different time periods, plural sets of driving signals are respectively transmitted to driving lines of the touch panel to drive sensing lines of the touch panel to generate plural sets of sensing signals. The plural sets of sensing signals are respectively received and calculated to obtain plural sets of summation signals. One set of summation signals includes first summation signals, and another set of summation signals includes second summation signals. A part or all of the first summation signals is replaced by the second summation signals. A signal value of a combination of the first and the second summation signals is calculated to obtain a summation thereof. The summation of the signal value of the combination is smaller than a summation of a signal values of the first summation signals before recombination.

26 Claims, 5 Drawing Sheets

Related U.S. Application Data

(60) Provisional application No. 62/019,433, filed on Jul. 1, 2014.

(58) Field of Classification Search
CPC . G06F 2203/04104; G06F 2203/04105; G06F 2203/04107; G06F 1/16
See application file for complete search history.

(56) References Cited

U.S. PATENT DOCUMENTS

| | | | | |
|---|---|---|---|---|
| 9,036,650 | B2* | 5/2015 | Wilson | G06F 3/044 345/173 |
| 9,285,902 | B1* | 3/2016 | Kremin | G06F 3/044 |
| 9,317,157 | B2 | 4/2016 | Chao et al. | |
| 2008/0309625 | A1* | 12/2008 | Krah | G06F 3/041 345/173 |
| 2013/0076700 | A1* | 3/2013 | Chiu | G06F 3/0418 345/179 |
| 2013/0211757 | A1 | 8/2013 | Miyamoto | |
| 2014/0022211 | A1* | 1/2014 | Karpin | G06F 3/044 345/174 |
| 2014/0104236 | A1 | 4/2014 | Hamaguchi et al. | |
| 2015/0185956 | A1* | 7/2015 | Takayama | G06F 3/0418 345/174 |
| 2015/0234521 | A1 | 8/2015 | Chao et al. | |
| 2015/0261353 | A1 | 9/2015 | Lu et al. | |

FOREIGN PATENT DOCUMENTS

| | | |
|---|---|---|
| TW | 201243679 | 11/2012 |
| TW | 201533634 | 9/2015 |
| TW | 201535212 | 9/2015 |

OTHER PUBLICATIONS

"Office Action of China Counterpart Application," dated Aug. 1, 2017, p. 1-5.

* cited by examiner

TOUCH APPARATUS, TOUCH CONTROLLER THEREOF AND NOISE DETECTION METHOD

CROSS-REFERENCE TO RELATED APPLICATION

This application is a continuation-in-part application of and claims the priority benefit of a prior application Ser. No. 14/285,604, filed on May 22, 2014, now pending. This application also claims the priority benefits of U.S. provisional application Ser. No. 62/019,433, filed on Jul. 1, 2014 and Taiwan application serial no. 103137836, filed on Oct. 31, 2014. The entirety of each of the above-mentioned patent applications is hereby incorporated by reference herein and made a part of this specification.

BACKGROUND OF THE INVENTION

Field of the Invention

The invention relates to an electronic apparatus and a controller thereof, and more particularly, the invention relates to a touch apparatus and a touch controller thereof.

Description of Related Art

Many noise detection methods may be implemented in communication systems. Generally speaking, the noise detection methods may be divided into pre-evaluation and post-hoc analysis methods. In noise pre-evaluation methods, signal channels are evaluated before signal transmission to determine whether noise signals exist. However, noise pre-evaluation costs extra time and lowers the signal transmission rate. In a touch apparatus, noise pre-evaluation results in a reduced report rate from the touch controller. In noise post-hoc analysis methods, noise analysis is performed after the transmitted data is received to analyze whether the data is noisy. However, noise post-hoc analysis requires the processing speed of the touch controller to be sufficiently fast, and the processing speed must be faster than the transmission speed of the data transmission terminal to prevent the slowing of the touch controller report rate. Moreover, the issue of false report rate must be considered when using post-hoc analysis methods for noise detection. To ensure a preferably low false report rate, the statistical methods used must be sufficient. This results in low touch controller report rate, or the circuitry used by the touch controller to process data may be too complex.

On the other hand, in current multi-scan touch apparatuses, inverse matrix operation is typically adopted to obtain raw data solutions. These methods merely distribute the noise to each of the solutions, but do not actually eliminate system noise. Therefore, when an extremely large noise signal appears, these methods can only distribute this noise signal evenly in each solution, without effective elimination of the noise signal. In other words, conventional multi-scan touch systems generally adopt inverse matrix operation only to obtain raw data solutions, but these touch systems do not have noise detection or noise correction capabilities.

SUMMARY OF THE INVENTION

The invention provides a touch apparatus and a touch controller thereof capable of rapidly evaluating noise signals and optimizing the evaluation results.

The invention provides a touch controller adapted for driving a touch panel. The touch panel includes a plurality of driving lines and a plurality of sensing lines electrically connected to the driving lines. The touch controller includes a drive circuit and a control circuit. In a first time period, the drive circuit transmits a plurality of first driving signals to the driving lines to drive the sensing lines to generate a plurality of first sensing signals. In a second time period, the drive circuit transmits a plurality of second driving signals to the driving lines to drive the sensing lines to generate a plurality of second sensing signals. In the first time period, the control circuit receives and calculates the first sensing signals to obtain a plurality of first summation signals. In the second time period, the control circuit receives and calculates the second sensing signals to obtain at least one second summation signal. The control circuit replaces a part or all of the first summation signals with the at least one second summation signal, so that a summation of a signal value of a combination of the at least one second summation signal and the first summation signals which are not replaced is smaller than a summation of signal values of the first summation signals before recombination.

The invention provides a touch apparatus, including a touch panel and a touch controller. The touch panel includes a plurality of driving lines and a plurality of sensing lines electrically connected to the driving lines. The touch controller is adapted for driving the touch panel. The touch controller includes a drive circuit and a control circuit. In a first time period, the drive circuit transmits a plurality of first driving signals to the driving lines to drive the sensing lines to generate a plurality of first sensing signals. In a second time period, the drive circuit transmits a plurality of second driving signals to the driving lines to drive the sensing lines to generate a plurality of second sensing signals. In the first time period, the control circuit receives and calculates the first sensing signals to obtain a plurality of first summation signals. In the second time period, the control circuit receives and calculates the second sensing signals to obtain at least one second summation signal. The control circuit replaces a part or all of the first summation signals with the at least one second summation signal, so that a summation of a signal value of a combination of the at least one second summation signal and the first summation signals which are not replaced is smaller than a summation of signal values of the first summation signals before recombination.

The invention provides a noise detection method of a touch panel. The touch panel includes a plurality of driving lines and a plurality of sensing lines electrically connected to the driving lines. The noise detection method includes the following steps. In a plurality of different time periods, a plurality of sets of driving signals are respectively transmitted to the driving lines to drive the sensing lines to generate a plurality of sets of sensing signals. In the different time periods, the sets of sensing signals are respectively received and calculated to obtain a plurality of sets of summation signals. Moreover, one set of the plurality of sets of summation signals includes a plurality of first summation signals, and another set of the plurality of sets of summation signals includes at least one second summation signal. A part or all of the first summation signals is replaced with the at least one second summation signal, so as to obtain a combination of the at least one second summation signal and the first summation signals. A signal value of the combination of the at least one second summation signal and the first summation signals is calculated, so as to obtain a summation of the signal value. A summation of the signal value of the combination of the at least one second summation signal and the first summation signals which are not replaced is smaller than a summation of signal values of the first summation signals before recombination.

According to an embodiment of the invention, the summation of the signal value of the combination of the at least one second summation signal and the first summation signals which are not replaced is a smallest summation of the signal values of all of the combinations of the at least one second summation signal and the first summation signals which are not replaced.

According to an embodiment of the invention, the control circuit selects one or more second summation signals from the at least one second summation signal to replace a part of the first summation signals, so as to obtain the combination of the at least one second summation signal and the first summation signals which are not replaced.

According to an embodiment of the invention, the first summation signals which are not replaced correspond to a part of the sensing lines, and the at least one second summation signal replacing the first summation signals corresponds to the rest of the sensing lines.

According to an embodiment of the invention, a summation of a quantity of the first summation signals which are not replaced and a quantity of the at least one second summation signal replacing the first summation signals is equal to a quantity of all of the sensing lines.

According to an embodiment of the invention, the control circuit selects all of the at least one second summation signal to replace all of the first summation signals, so as to obtain the combination of the at least one second summation signal and the first summation signals which are not replaced.

According to an embodiment of the invention, the at least one second summation signal replacing the first summation signals corresponds to all of the sensing lines.

According to an embodiment of the invention, a quantity of the at least one second summation signal replacing the first summation signals is equal to all of a quantity of the sensing lines.

According to an embodiment of the invention, a quantity of the first summation signals which are not replaced is greater than, less than, or equal to a quantity of the at least one second summation signal replacing the first summation signals.

According to an embodiment of the invention, a time length of the first time period is longer than, shorter than, or equal to a time length of the second time period.

According to an embodiment of the invention, each of the first driving signals has a first polarity pattern and a second polarity pattern. In the first time period, an operation of the first polarity pattern and the second polarity pattern of each of the first driving signals is substantially equal to zero. Each of the second driving signals has the first polarity pattern and the second polarity pattern. In the second time period, the operation of the first polarity pattern and the second polarity pattern of each of the second driving signals is substantially equal to zero.

In summary, the touch apparatus and the touch controller thereof in the disclosure replace a part or all of the first summation signals with the second summation signals. Accordingly, not only is rapid and accurate evaluation of a noise summation achieved, but the noise summation can be optimized.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
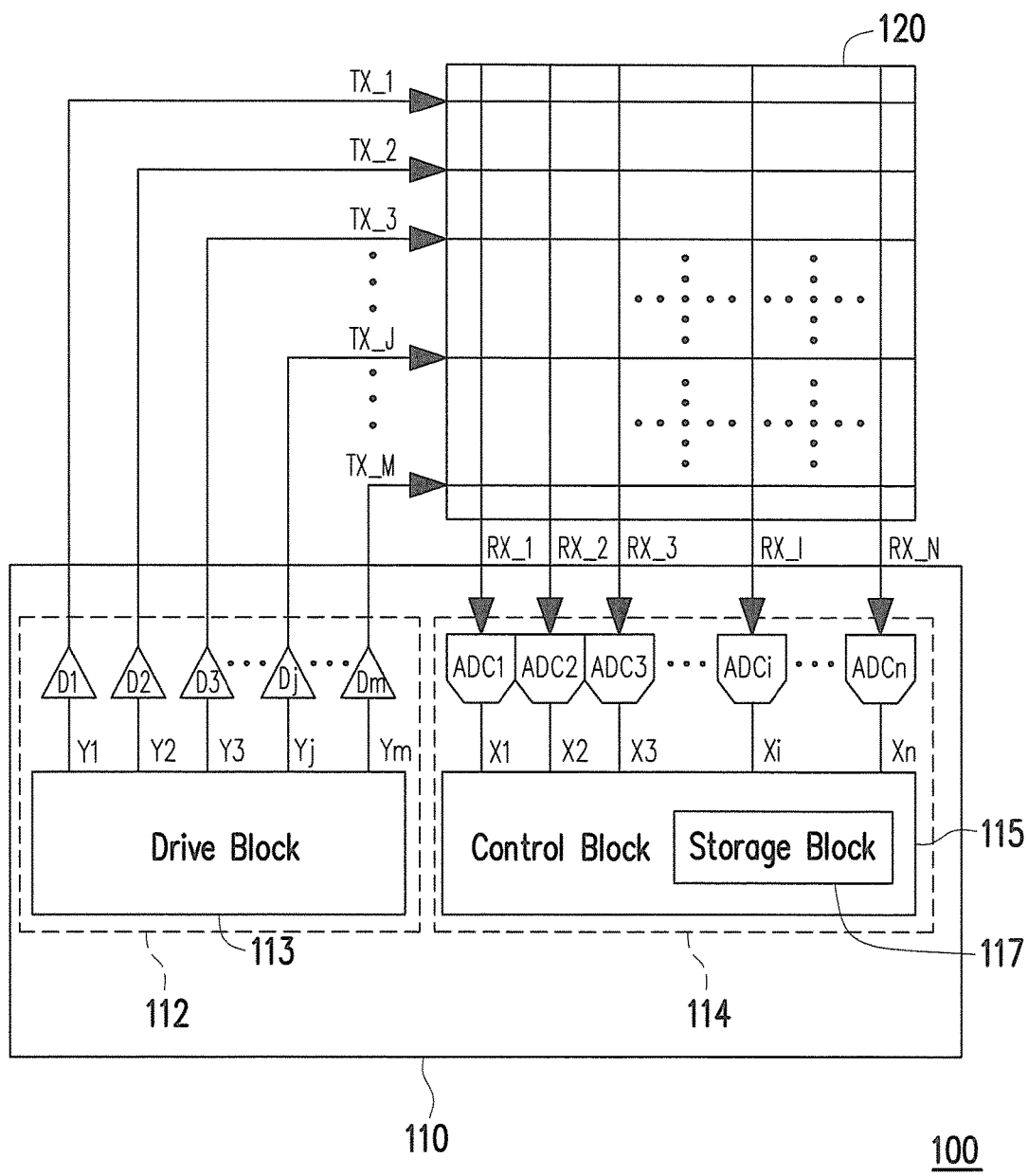
FIG. 1 is a schematic view of a touch apparatus according to an embodiment of the invention.

FIG. 1 is a schematic view of a touch apparatus according to an embodiment of the invention. With reference to FIG. 1, a touch apparatus 100 of the present embodiment includes a touch controller 110 and a touch panel 120. The touch panel 120 includes a plurality of driving lines TX_1-TX_M and a plurality of sensing lines RX_1-RX_N for sensing a touch gesture on the touch panel 120. The touch controller 110 includes a drive circuit 112 and a control circuit 114, in which M, N are positive integers greater than 1. In a time period having a specific time length, the drive circuit 112 transmits a plurality of driving signals Y1-Ym to the driving lines TX_1-TX_M to drive the sensing lines RX_1-RX_N to generate a plurality of sensing signals X1-Xn, in which m and n are positive integers greater than 1. The control circuit 114 receives and calculates the first sensing signals to obtain a plurality of first summation signals, and in the second time period, the control circuit receives the sensing signals X1-Xn and calculates the signal values of the sensing signals X1-Xn to obtain a plurality of summation signals RX Sum_1-RX Sum_n (as shown in equation (1)), in which i is an integer greater than or equal to 1 and less than or equal to n. For example, in the time period having the specific time length, the control circuit 114 may receive the sensing signal X1 transmitted by the sensing line RX_1 and calculate a summation of the signal value of the sensing signal X1 to obtain the summation signal RX Sum_1 of the sensing line RX_1 in the time period having the specific time length. In the present embodiment, the manner in which the rest of the sensing lines RX_2-RX_N obtains the summation signals RX Sum_2-RX_Sum_n in the same time period may be similarly interpreted by analogy, and therefore further elaboration thereof is omitted hereafter.

In the present embodiment, the drive circuit 112 includes a drive block 113 and the output amplifiers D1-Dm disposed in an output terminal of the drive block 113. The output amplifiers D1-Dm increase a drive capability of the driving signals Y1-Ym and transmit the drive signals Y1-Ym to the driving lines TX_1-TX_M. In the present embodiment, the control circuit 114 includes a control block 115 and the analog-to-digital converters ADC1-ADCn disposed in an input terminal of the control block 115. The analog-to-digital converters ADC1-ADCn receives analog sensing signals X1-Xn transmitted by the sensing lines RX_1-RX_N, and after converting the analog sensing signals X1-Xn into digital sensing signals X1-Xn, the analog-to-digital converters ADC1-ADCn transmit the digital sensing signals X1-Xn to the control block 115. The control block 115 respectively calculates a summation of the signal values of the sensing signals X1-Xn, so as to obtain the summation signals RX Sum_1-RX Sum_n of the sensing lines RX_1-RX_N in the time period having the specific time length. In the present embodiment, the control block 115 includes a storage block 117 storing the digital sensing signals X1-Xn, as well as the summation signal RX Sum_1-RX Sum_n obtained after signal processing.

Figure 2:
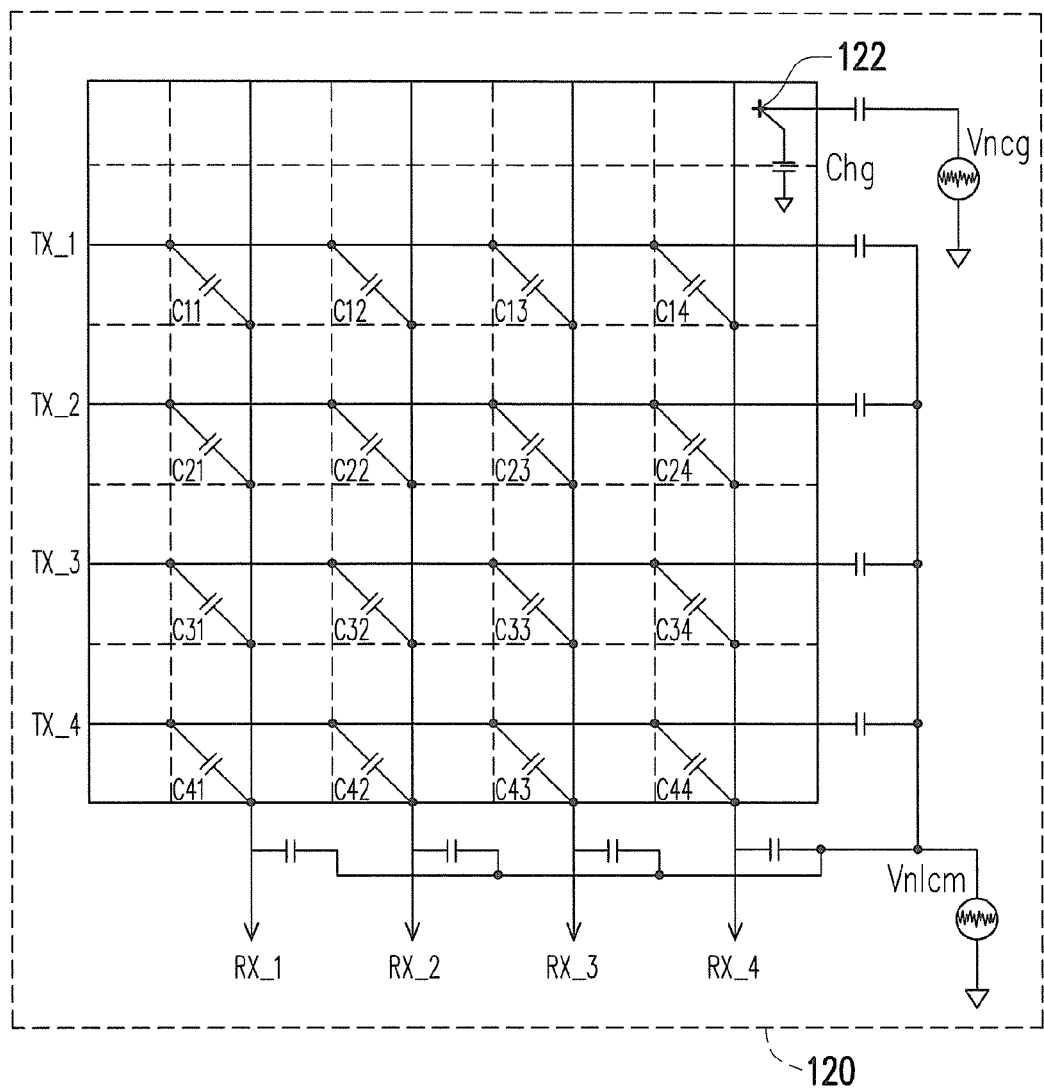
FIG. 2 is a partial schematic view of the touch panel depicted in FIG. 1.

FIG. 2 is a partial schematic view of the touch panel depicted in FIG. 1. With reference to FIG. 1 and FIG. 2, in an illustrative example, only four driving lines TX_1-TX_4 and four sensing lines RX_1-RX_4 are drawn in FIG. 2 to facilitate description, although the invention is not limited by the quantity. In the present embodiment, the touch panel 120 may be a capacitive touch panel that determines a touch information of a touch gesture using a mutual capacitance principle, such as the location where the touch gesture occurs on the touch panel 120. As shown in FIG. 2, the signal values on the touch panel 120 sensed by the sensing lines RX_1-RX_4 may originate from two sources: 1) capacitance values the noise signals thereof generated by a touch point between the driving lines TX1-TX4 and sense lines RX1-RX4, and the magnitude of the sum of the two is represented by the capacitance values C11-C44; and 2) other noise signals generated due to outside factors, including liquid crystal module noise Vnlcm and charger noise Vncg. The liquid crystal module noise Vnlcm may be caused by the noise signals generated when the display module (not drawn) integrated with the touch panel 120 is driven. The charger noise Vncg may be due to an object 122 (e.g., finger or stylus) in contact with the touch panel 120 forming a charge/discharge path with a ground terminal, thereby generating a capacitance change Chg and bringing noise signals. Liquid crystal module noise Vnlcm and the charger noise Vncg are noise signals generated by outside factors, and these noise signals may cause the touch controller 110 to false report the location of the touch gesture on the touch panel 120. Therefore, it is necessary to develop a fast and accurate noise detection mechanism that profiles the noise signals of the touch panel 120 due to outside factors.

Figure 3:
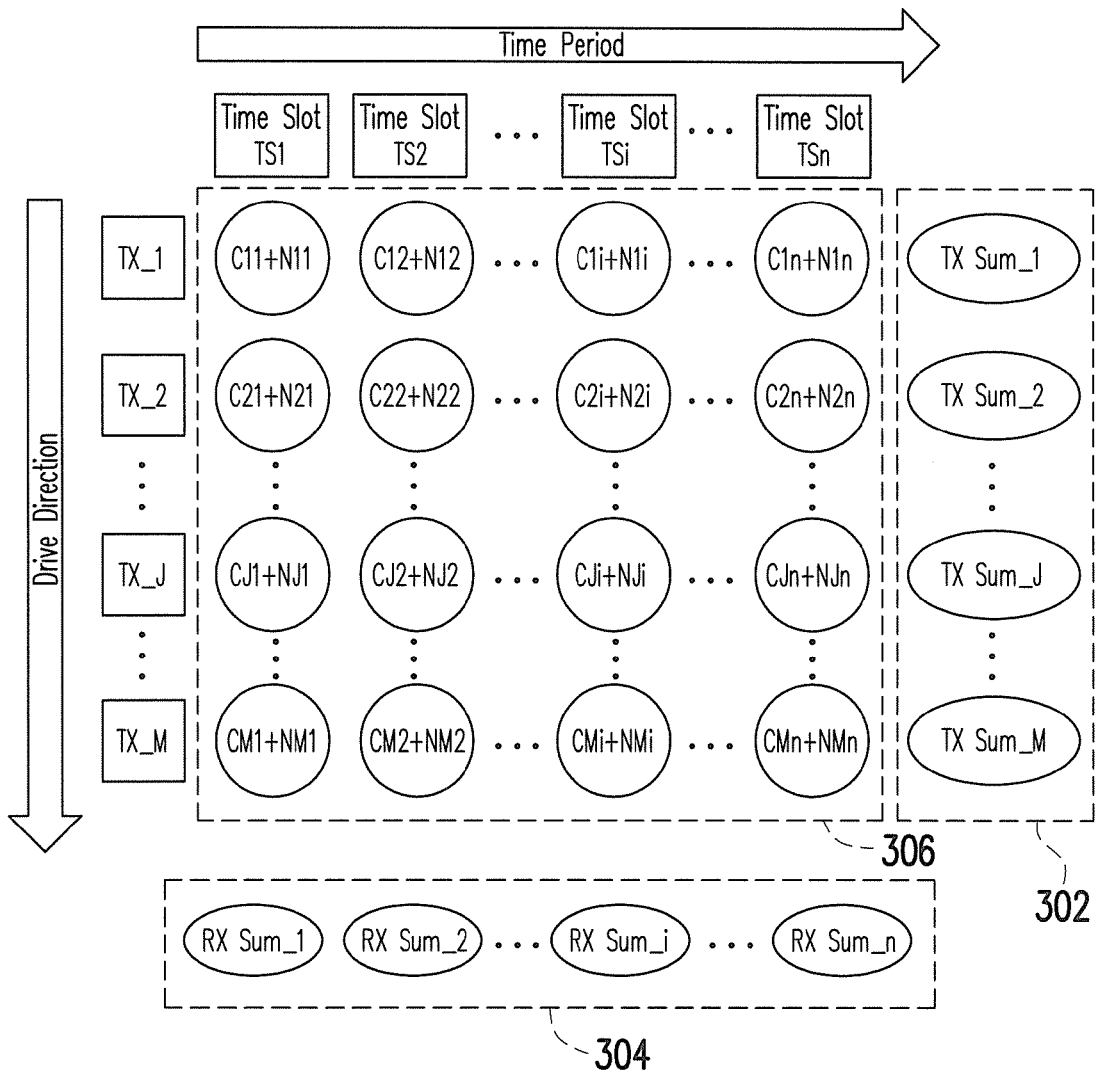
FIG. 3 is a schematic diagram illustrating a data distribution when the touch panel depicted in FIG. 1 is driven according to an embodiment of the invention.

FIG. 3 is a schematic diagram illustrating a data distribution when the touch panel 120 depicted in FIG. 1 is driven according to an embodiment of the invention. With reference to FIG. 3, the horizontal axis represents a time period having time increasing from left to right, and the vertical direction represents a drive direction of the touch panel 120, with the driving line TX_1 scanning to the driving line TX_M from top to bottom. In the present embodiment, the time period include a plurality of time slots TS1-TSn. In a region 306, a data Cji+Nji corresponding to each intersection of the driving lines TX_1-TX_M and the sensing lines RX_1-RX_N represents a summation of a capacitance value Cji generated by the touch gesture and a noise signal Nji generated by outside factors, in which j is a positive integer from 1 to M, i is a positive integer from 1 to n, and M and n are positive integers greater than 1. The noise signal Nji includes the liquid crystal module noise Vnclm and the charger noise Vncg, for example. In region 304, the summation signals RX Sum_1-RX Sum_n corresponding to the locations of the sensing lines RX_1-RX_n of FIG. 1 represent the summations obtained by the control block 115 respectively calculating the signal values of the sensing signals X1-Xn in this time period. In other words, the summation signal RX Sum_i represents a summation of the data obtained by the sensing line RX_I from each of the driving lines TX_1-TX_M in the time slot Tsi of this time period, in which I is a positive integer from 1 to N. For example, the summation signal RX Sum_1 represents a summation of C11+N11 to CM1+NM1 in the time slot TS1 of this time period. The summation signals RX Sum_1-RX Sum_n may be described by the following equation:

$$RX\ \text{Sum\_i} = \sum_{j=1}^{M} Cji + Nji \quad (1)$$

in which RX Sum, represents the summation signals, Cji represents the capacitance value generated by the touch gesture, Nji represents the noise signals generated by the touch panel 120 due to outside factors, in which j is a positive integer from 1 to M, i is a positive integer from 1 to n, and M and n are positive integers greater than 1.

In the present embodiment, each of the driving signals Y1-Ym has a first polarity pattern and a second polarity pattern. In this time period, an operation of the first polarity pattern and the second polarity pattern of each of the driving signals Y1-Ym substantially equals zero. In this example, the operation of the first polarity pattern and the second polarity pattern of each of the driving signals Y1-Ym may be to obtain a summation thereof. In other words, in a region 302, the summations TX Sum_1-TX Sum_M of each of the driving signals corresponding to the locations of the driving lines TX_1-TX_M of FIG. 1 are respectively zero, which means that in this time period, the summation of the first polarity pattern and the second polarity pattern of each of the driving signals Y1-Ym substantially equals zero.

An illustrative example below has four driving signals Y1-Y4. In the present embodiment, in a time period having two time slots TS1 and TS2, the polarity distribution states of each of the driving signals Y1-Y4 may be as shown in Table 1:

TABLE 1

|     | TX_1 (Y1) | TX_2 (Y2) | TX_3 (Y3) | TX_4 (Y4) |
| --- | --- | --- | --- | --- |
| TS1 | −1 | 1 | 1 | −1 |
| TS2 | 1 | −1 | −1 | 1 |

In Table 1, "1" represents the driving signals Y1-Y4 has the first polarity pattern in the corresponding time slots, and "−1" represents the driving signals Y1-Y4 has the second polarity pattern in the corresponding time slots. Therefore, in the column of the driving line TX_1, after the time period having the two time slots TS1 and TS2 has passed, the summation of the first polarity pattern and the second polarity pattern of the driving signal Y1 of the driving line TX_1 substantially equals to zero. The polarity distribution states of the driving signals Y2-Y4 of the driving lines TX_2-TX_4 may be similarly interpreted by analogy.

Figure 4:
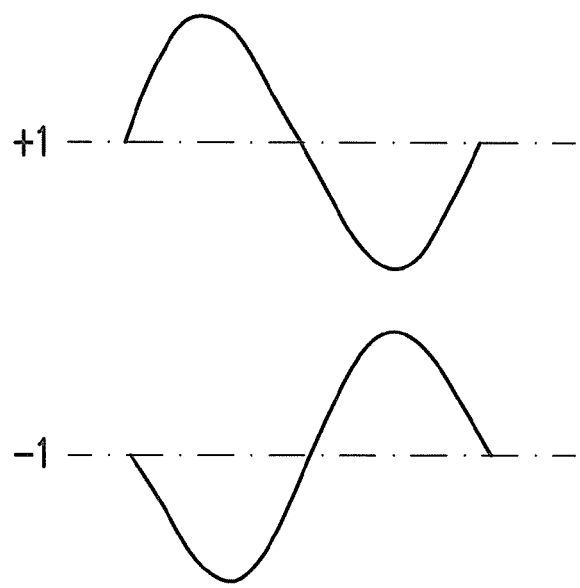
FIG. 4 is a waveform diagram of driving signals according to an embodiment of the invention.
Figure 5:
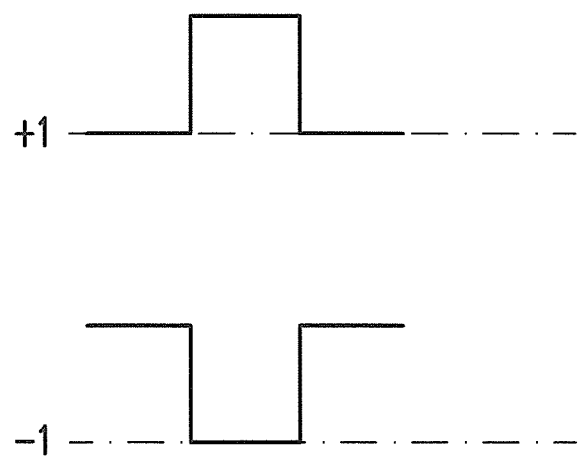
FIG. 5 is a waveform diagram of driving signals according to another embodiment of the invention.

A sine wave is used for the driving signals Y1-Y4 as a next illustrative example. FIG. 4 is a waveform diagram of driving signals according to an embodiment of the invention, including a driving signal having the first polarity pattern "1" and a driving signal having the second polarity signal "−1," in which the summation of the two substantially equals to zero. Moreover, the waveform of the driving signals in the invention is not limited to the sine wave, and the waveform may also be a rectangular wave. A rectangular wave is used for the driving signals as a next illustrative example. FIG. 5 is a waveform diagram of driving signals according to another embodiment of the invention, including a driving signal having the first polarity pattern "1" and a driving signal having the second polarity signal "−1," in which the summation of the two substantially equals to zero. It should be noted that, "1," "−1," sine wave, and rectangular wave are only used to facilitate description of the first polarity pattern and the second polarity pattern for each of the driving signals Y1-Ym, and the invention should not be construed as limited thereto.

The polarity distribution pattern of each of the driving signals Y1-Y4 is not limited to the patterns shown in Table 1. An illustrative example below has four driving signals Y1-Y4. In the present embodiment, in a time period having four time slots TS1-TS4, and the polarity distribution states of each of the driving signals Y1-Y4 may be as shown in Table 2:

TABLE 2

|     | TX_1 (Y1) | TX_2 (Y2) | TX_3 (Y3) | TX_4 (Y4) |
| --- | --- | --- | --- | --- |
| TS1 | −1 | −1 | 1  | −1 |
| TS2 | 1  | −1 | −1 | 1  |
| TS3 | −1 | 1  | −1 | 1  |
| TS4 | 1  | 1  | 1  | −1 |

In this example, after the time period having the four time slots TS1-TS4 has passed, the summation of the first polarity pattern and the second polarity pattern for each of the driving signals Y1-Y4 substantially equals to zero.

The polarity distribution pattern of each of the driving signals Y1-Y4 is not limited to the patterns shown in Table 1 and Table 2. Table 3 describes the polarity distribution states of each of the driving signals according to another embodiment of the invention:

TABLE 3

|     | TX_1 (Y1) | TX_2 (Y2) | TX_3 (Y3) | TX_4 (Y4) |
| --- | --- | --- | --- | --- |
| TS1 | −1 | −1 | 1  | −1 |
| TS2 | 1  | −1 | −1 | 1  |
| TS3 | 1  | 1  | −1 | 1  |
| TS4 | 1  | 1  | 1  | −1 |
| TS1 | 1  | 1  | −1 | 1  |
| TS2 | −1 | 1  | 1  | −1 |
| TS3 | −1 | −1 | 1  | −1 |
| TS4 | −1 | −1 | −1 | 1  |

In this example, after the time period having the four time slots TS1-TS4 has passed, the summation of the first polarity pattern and the second polarity pattern for each of the driving signals Y1-Y4 substantially equals to zero. Taking the driving aline TX_1 column as an example, the driving signal Y1 has two types of polarity patterns in a same time slot. For example, the driving signal Y1 has two types of polarity patterns "1" and "−1" concurrently in the time slot TS1. After the time period having the four time slots TS1-TS4 has passed, the summation of the first polarity pattern and the second polarity pattern for the driving signal Y1 substantially equals to zero, that is, [(−1)+1+1+1]+[1+(−1)+(−1)+(−1)]=0. The polarity distribution states of the driving signals Y2-Y4 of the driving lines TX_2-TX_4 may be similarly interpreted by analogy. After the time period having the four time slots TS1-TS4 has passed, the summations of the first polarity pattern and the second polarity pattern for the driving signals Y2-Y4 also substantially equal to zero.

The polarity distribution pattern of each of the driving signals Y1-Y4 is not limited to the patterns shown in Table 1 to Table 3. Table 4 describes the polarity distribution states of each of the driving signals according to another embodiment of the invention:

TABLE 4

|     | TX_1 (Y1) | TX_2 (Y2) | TX_3 (Y3) | TX_4 (Y4) |
| --- | --- | --- | --- | --- |
| TS1 | −1 | −1 | 1  | −1 |
| TS2 | 1  | −1 | −1 | 1  |
| TS3 | 1  | 1  | −1 | 1  |
| TS4 | 1  | 1  | 1  | −1 |
| TS1 | −1 | −1 | 1  | −1 |
| TS2 | 1  | −1 | −1 | 1  |
| TS3 | 1  | 1  | −1 | 1  |
| TS4 | 1  | 1  | 1  | −1 |

In this example, after the time period having the four time slots TS1-TS4 has passed, an operation of the first polarity pattern and the second polarity pattern for each of the driving signals Y1-Y4 substantially equals to zero. In this example, the operation of the first polarity pattern and the second polarity pattern for each of the driving signals Y1-Y4 may be to find a difference value thereof. Taking the driving line TX_1 column as an example, the driving signal Y1 has two types of polarity patterns in a same time slot. For example, the driving signal Y1 has two types of polarity patterns "1" and "−1" concurrently in the time slot TS1. After the time period having the four time slots TS1-TS4 has passed, the operation of the first polarity pattern and the second polarity pattern for the driving signal Y1 substantially equals to zero, that is, [(−1)+1+1+1]−[(−1)+1+1+1]=0. The polarity distribution states of the driving signals Y2-Y4 of the driving lines TX_2-TX_4 may be similarly interpreted by analogy. After the time period having the four time slots TS1-TS4 has passed, the operations of the first polarity pattern and the second polarity pattern for the driving signals Y2-Y4 also substantially equal to zero.

Although the foregoing Table 1 to Table 4 only uses four driving lines, four driving signals, and a time period having a specific number of time slots to facilitate description, the invention should not be construed as limited thereto. The polarity distrubtion states, operations, and effects of M driving lines and m driving signals in the time period having the specific time length are fully embodied and described in Table 1 to Table 4, and therefore further elaboration thereof is omitted hereafter.

With reference to FIG. 1 and FIG. 3, in the embodiment of FIG. 1, with at least the driving schemes disclosed in the embodiments of Table 1 to Table 4 used in conjunction, the control circuit 114 respectively calculates a summation of the signal values of the sensing signals X1-Xn in the time period having the specific time length, so as to obtain the summation signals RX Sum_1-RX Sum_n. Thereafter, the control circuit 114 calculates the summation signals RX Sum_1-RX Sum_n to obtain a summation NF of the summation signals RX Sum_1-RX Sum_n, that is, $$NF = RX\ Sum\_1 + RX\ Sum\_2 + \ldots + RX\ Sum\_(n-1) + RX\ Sum\_n = \sum_{j=1}^{M} \sum_{i=1}^{n} Nji.$$

The summation NF obtained by the control circuit 114 calculating the summation signals RX Sum_1-RX Sum_n represents the noise signals generated by the touch panel 120 due to outside factors. Therefore, by using the noise detection methods provided in the disclosure, the noise signals generated by the touch panel 120 in the touch apparatus 100 due to outside factors can be rapidly and accurately evaluated. Thereafter, the control circuit 114 transmits the summation signals RX Sum_1-RX Sum_n to a next stage circuit (not drawn) for suitable signal processing (e.g., inverse matrix operation), so as to obtain a raw data of a touch information which determines the touch gesture.

The noise detection methods provided by the disclosure may incorporate the concept of signal selection. Not only are the detection methods capable of rapid and accurate evaluation of the noise summation NF, but the noise detection methods can also effectively lower the noise summation NF. In specifics, the touch controller 110 may repeatedly execute the noise detection methods of the disclosure in different time periods, so as to obtain a plurality of sets of summation signals RX Sum_1-RX Sum_n. Moreover, the touch controller 110 may select from the sets of summation signals and calculate the summation signals RX Sum_1-RX Sum_n corresponding to the sensing lines RX_1-RX_N, so as to obtain a preferably small noise summation NF.

For example, in a first time period, the touch controller 110 executes a noise detection method for a first time. The drive circuit 112 respectively transmits a plurality of first driving signals Y11-Y1$m$ to the driving lines TX_1-TX_M, so as to drive the sensing lines RX_1-RX_N to generate a plurality of first sensing signals X11-X1$n$. Thereafter, the control circuit 114 receives and calculates the first sensing signals X11-X1$n$ to obtain a first set of summation signals. The first set of summation signals may include a plurality of first summation signals RX Sum_11-RX Sum_1$n$ respectively corresponding to sensing lines RX_1-RX_N.

In a second time period, the touch controller executes the noise detection method for a second time. The drive circuit 112 transmits a plurality of second driving signals Y21-Y2$m$ to the driving lines TX_1-TX_M, so as to drive the sensing lines RX_1-RX_N to generate a plurality of second sensing signals X21-X2$n$. Thereafter, the control circuit 114 receives and calculates the second sensing signals X21-X2$n$ to obtain a second set of summation signals. The second set of summation signals may include a plurality of second summation signals RX Sum_21-RX Sum_2$n$ respectively corresponding to sensing lines RX_1-RX_N. In the present embodiment, a time length of the first time period may be longer than, shorter than, or equal to a time length of the second time period.

Thereafter, the control circuit 114 selects one or more first summation signals from the first summation signals RX Sum_11-RX Sum_1$n$. In the present embodiment, corresponding with the sensing lines RX_2-RXN, for example, the control circuit 114 may select (n−1) first summation signals RX Sum_12-RX Sum_1$n$. The control circuit 114 then selects one or more second summation signals from the second summation signals RX Sum_21-RX Sum_2$n$. In the present embodiment, corresponding with the sensing line RX_1, the control circuit 114 may only select one second summation signal RX Sum_21 to replace the first summation signal RX Sum_11. Due to the selections of the control ciruit 114, a summation NF2 of the signal values of the selected first summation signals RX Sum_12-RX Sum_1$n$ and the signal value of the selected second summation signal RX Sum_21 is smaller than the summation NF1 of the signal values of the first summation signals RX Sum_11-RX Sum_1$n$ obtained by the control circuit 114 in the first time period.

In other words, in the present embodiment, corresponding with the sensing lines RX_1-RX_N, the control circuit 114 may select and calculate a combination of the second summation signal RX Sum_21 and the first summation signals RX Sum_12-RX Sum_1$n$, so as to obtain the noise summation NF2 that is smaller than the noise summation NF1. In the present embodiment, the control circuit 114 may be configured to calculate the signal values of the selected first summation signals RX Sum_12-RX Sum_1$n$ and the signal value of the selected second summation signal RX Sum_21, so as to obtain the summation NF2 of the two. The control ciruit 114 may also be configured to calculate the signal values of the first summation signals RX Sum_11-RX Sum_1$n$, so as to obtain the summation NF1 thereof. In other embodiments, the next stage circuit of the control circuit 114 may be used to calculate the summations NF1 and NF2 of the signal values.

In the present embodiment, the selected first summation signals RX Sum_12-RX Sum_1$n$ correspond to at least a part of the sensing lines RX_2-RX_n, and the selected second summation signal RX Sum_21 correspond to the rest of the sensing line RX_1. Moreover, in the present embodiment, a quantity of the selected first summation signals RX Sum_12-RX Sum_1$n$ may be (n−1), and a quantity of the selected second summation signal RX Sum_21 may be 1, such that a summation of the two quantities equals a total quantity n of all of the sensing lines RX_1-RX_N.

In the present embodiment, control circuit 114 may select the first summation signals or the second summation signals by comparing the magnitudes of the signal values of the first summation signals and the signal values of the second summation signals of a same sensing line in at least a part of the sensing lines RX_1-RXN, and the control circuit 114 may select the smaller of the two. Using the sensing line RX_1 as an example, the control circuit 114 compares the magnitudes of the signal value of the first summation signal RX Sum_11 and the signal value of the second summation signal RX Sum_21. In this example, the control circuit 114 may select the second summation signal RX Sum_21 having the smaller signal value to replace the first summation signal RX Sum_11 having the larger signal value, so as to obtain a smaller noise summation NF2 by calculation.

In the present embodiment, although the control circuit 114 selects only one second summation signal from the plurality of second summation signals RX Sum_21-RX Sum_2$n$, the invention is not limited thereto. In other embodiments, the control circuit 114 may select a part or all of the second summation signals to replace a part or all of the first summation signals, so as to obtain a smaller noise summation NF2. In other words, according to different embodiments, the quantity of the first summation signal selected by the control circuit 114 may be greater than, less than, or equal to the selected quantity of the second summation signal. In the present embodiment, the quantity of the first summation signal selected by the control circuit 114 is greater than the selected quantity of the second summation signal, although the invention is not limited thereto.

In the present embodiment, when the touch controller 110 executes the noise detection method for the second time, the touch controller 110 fully obtains all of the second summation signals RX Sum_21-RX Sum_2$n$, which represents that in this example, the time length of the first time period is equal to the time length of the second time period, although the invention is not limited thereto. In other embodiments, according to the requirements needed by an application, when the touch controller 110 executes the noise detection method for the second time, the touch controller 110 does not necessarily need to fully obtain all of the second summation signals RX Sum_21-RX Sum_2n, so as to accelerate the execution of the noise detection method. That is, in this example, the time length of the first time period is longer than the time length of the second time period. For instance, with reference to FIG. 3, when the touch controller 110 executes the touch detection method for the first time in the first time period, the first time period may include a time length of n time slots TS1-TSn, such that the controller circuit 114 obtains n first summation signals RX Sum_11-RX Sumin. Thereafter, when the touch controller 110 executes the touch detection method for the second time in the second time period, the second time period may include a time length of less than n time slots TS1-TSi. In this example, the control circuit 114 may obtain i second summation signals RX Sum_21-RX Sum_2i, and the controller circuit 114 may select the second summation signal RX Sum_21 having the smaller signal value from the i second summation signals RX Sum_21-RX Sum_2i to replace the first summation signal RX Sum_11 having the larger signal value, so as to obtain a smaller noise summation NF2. In the present embodiment, the second time period may also have a time length of only one time slot TS1. In the present embodiment, after the control circuit 114 obtains the second summation signal RX Sum_21, the magnitudes of the second summation signal RX Sum_21 and the first summation signal RX Sum_11 can be compared. When the second summation signal RX Sum_21 is smaller, the second summation signal RX Sum_21 is used to replace the first summation signal RX Sum_11 having a larger signal value, so as to obtain a smaller noise summation NF2.

In the present embodiment, with the selection by the controller circuit 114, the signal value summation NF2 is smaller than the signal value summation NF1, although the invention is not limited thereto. In other embodiments, with the selection by the controller circuit 114, the summation NF2 of the signal values of the selected first summation signal and the second summation signal may be chosen as the smallest summation of the signal values of the possible combinations of the first summation singals RX Sum_11-RX Sum_1n obtained in the first time period and the second summation signals RX Sum_21-RX Sum_2n obtained in the second time period. In other words, the summation of the signal value of the selected first summation signal and the signal value of the selected second summation signal is the smallest of the summations of the signal values of any at least one portion of the first summation signals and the signal values of any at least one portion of the second summation signals.

In the present embodiment, in order to enable rapid and accurate evaluation of the noise signals generated by the touch panel 120 in the touch apparatus 100 due to outside factors, that is, evaluation of signal value summations NF1 and NF2, each of the first driving signals Y11-Y1m and each of the second driving signals Y21-Y2m respectively has the first polarity pattern and the second polarity pattern. In the first time period, an operation of the first polarity pattern and the second polarity pattern of each of the first driving signals Y11-Y1m substantially equals to zero. In the second time period, an operation of the first polarity pattern and the second polarity pattern of each of the second driving signals Y21-Y2m substantially equals to zero.

In the disclosure hereafter, FIG. 1 and FIG. 2 are used to describe a noise detection method and signal selection scheme according to an embodiment of the invention.

In one example, in the first time period, the drive circuit 112 drives the sensing lines RX_1-RX_4 to generate a plurality of first sensing signals X11-X14. The drive circuit 114 calculates the first sensing siganls X11-X14 in the first time period to obtain a plurality of first summation signals A, B, C, and D respectively corresponding to the sensing lines RX_1-RX_4. A summation NF3 of the signal values of the first summation signals A, B, C, and D, that is, NF3=A+B+C+D, represents the noise signal value evaluated and obtained by the touch controller 110 after executing the noise detection method for the first time. Thereafter, in the second time period, the drive circuit 112 drives the sensing lines RX_1-RX_4 to generate a plurality of second sensing signals X21-X24. The drive circuit 114 calculates the second sensing siganls X21-X24 in the second time period to obtain a plurality of second summation signals A', B', C', and D' respectively corresponding to the sensing lines RX_1-RX_4. A summation NF4 of the signal values of the second summation signals A', B', C', and D', that is, NF4=A'+B'+C'+D', represents the noise signal value evaluated and obtained by the touch controller 110 after executing the noise detection method for the second time.

In the present embodiment, the controller circuit 114 uses at least one second summation signal A', B', C', and D' to replace a part or all of the first summation signals A, B, C, and D, so that a summation NF5 of a signal value of a combination of the second summation signals A', B', C', and D' and the first summation signals A, B, C, and D after recombination is smaller than the summation NF3 of the signal value of the first summation signals before recombination.

In one embodiment, the controller circuit 114 may select one of the second summation signals A', B', C', and D' to replace one of the corresponding first summation signals A, B, C, and D. For example, the control circuit 114 may select the second summation signal A' to replace the first summation signal A, so as to obtain the summation NF5 of a signal value of a combination of the first summation signals A, B, C, and D and the second summation signal A'. Moreover, the signal value summation NF5 is smaller than the summation NF3 of the signal value of the first summation signals before recombination.

In another embodiment, the control circuit 114 may select any two of the second summation signals A', B', C', and D' to replace two of the corresponding first summation signals A, B, C, and D. For example, the control circuit 114 may select the second summation signals A' and B' to replace the first summation signals A and B, so as to obtain the summation NF5 of a signal value of a combination of the first summation signals C and D and the second summation signals A' and B'. Alternatively, the control circuit 114 may also select the second summation signals A' and C' to replace the first summation signals A and C, so as to obtain the summation NF5 of a signal value of a combination of the first summation signals B and D and the second summation signals A' and C'. The signal value summation NF5 is smaller than the summation NF3 of the signal value of the first summation signals before recombination. In other words, in this embodiment, the second summation signals used to replace the first summation signals may be adjacent or not adjacent to each other.

In another embodiment, the control circuit 114 may select any three of the second summation signals A', B', C', and D' to replace three of the corresponding first summation signals A, B, C, and D. For example, the control circuit 114 may select the second summation signals A', B', and C' to replace the first summation signals A, B, and C, so as to obtain the summation NF5 of a signal value of a combination of the first summation signal D and the second summation signals A', B', and C'. Alternatively, the control circuit 114 may also select the second summation signals A', B', and D' to replace the first summation signals A, B, and D, so as to obtain the summation NF5 of a signal value of a combination of the first summation signal C and the second summation signals A', B', and D'. The signal value summation NF5 is smaller than the summation NF3 of the signal value of the first summation signals before recombination. In other words, in this embodiment, the second summation signals used to replace the first summation signals may be completely adjacent or not adjacent to each other, or partially adjacent or not adjacent to each other.

In another embodiment, the control circuit 114 may select all of the second summation signals A', B', C', and D' to replace all of the first summation signals A, B, C, and D. In this example, a combination of the first summation signals and the second summation signals is A', B', C', and D', and a summation of the signal value of the combination is NF4. Moreover, the signal values of the second summation signals A', B', C', and D' obtained by the touch controller 110 executing the noise detection method for the second time are smaller than the signal values of the first summation signals A, B, C, and D. Therefore, a new signal combination is obtained when all of the second summation signals A', B', C', and D' are used to replace the first summation signals A, B, C, and D.

In the embodiments where the control circuit 114 selects one, two, or three of the second summation signals A', B', C', and D' to replace the first summation signals A, B, C, and D, the touch controller 110 does not need to completely execute the noise detection method. That is, the time length of the first time period is longer than the time length of the second time period.

In addition, in the present embodiment, a principle of the control circuit 114 selecting the second summation signals A', B', C', and D' to replace the first summation signals A, B, C, and D may also be as follows. The principle used by the control circuit 114 may include, for example, selecting a smallest summation of the signal values of all of the combinations of the second summation signals and the first summation signals as the summation of the signal value of the combination of the second summation signals and the first summation signals. Taking FIG. 2 as an example, there are a total of 16 possible combinations of the second summation signals and the first summation signals, including the two combinations A', B', C', D', and A, B, C, D. After noise detection is executed twice, a combination of the second summation signal and the first summation signals may be A', B, C, D, in which the summation NF5 of the signal values thereof is the smallest of the summations of the signal values of all 16 combinations.

In the present embodiment, searching for the combination arrangements of each of the second summation signals and the first summation signals may include the genetic algorithm method, the simulated annealing method, the gradient descent method, and Newton's method, for example, although the invention is not limited thereto.

Although FIG. 2 only uses four driving lines and four sensing lines to facilitate description, the invention is not limited thereto. The noise detection method and result optimization for M driving lines and N sensing lines in the time period having the specific time length are fully embodied by the description of FIG. 2, and therefore further elaboration thereof is omitted hereafter.

Figure 6:
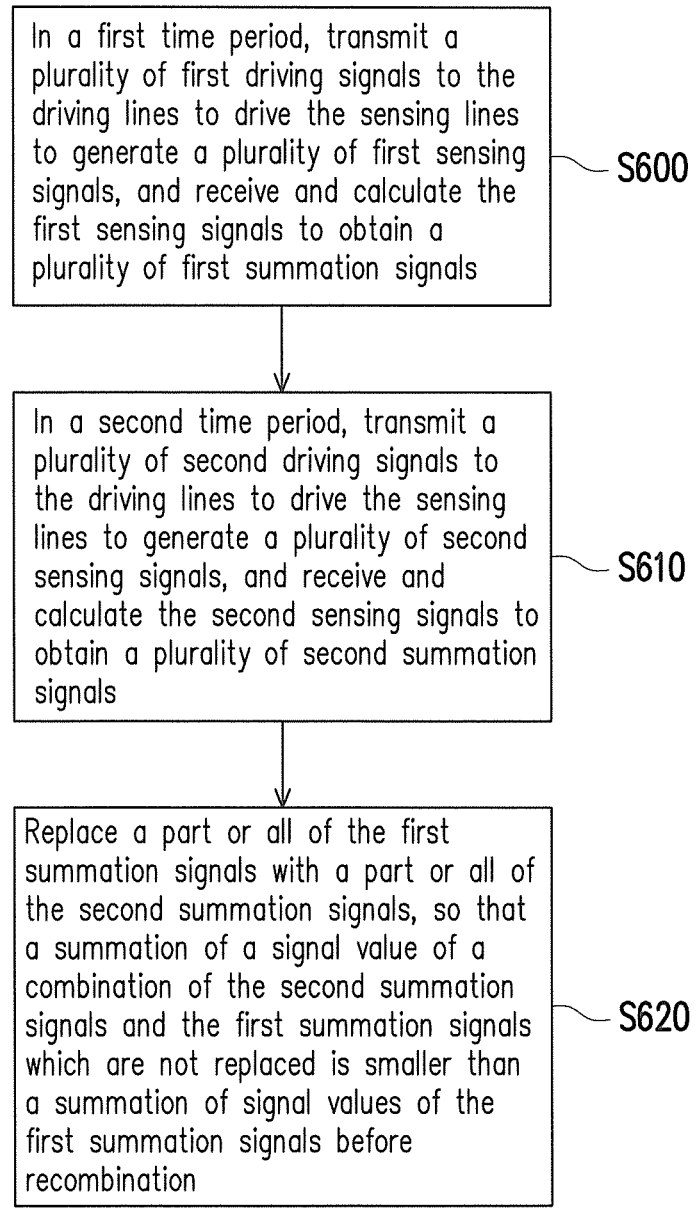
FIG. 6 is a flow diagram of a noise detection and result optimization method according to an embodiment of the invention.

FIG. 6 is a flow diagram of a noise detection and result optimization method according to an embodiment of the invention. With reference to FIG. 1 to FIG. 3, the noise detection and result optimization method of the present embodiment is at least suitable for the touch apparatus 100 depicted in FIG. 1. The noise detection and result optimization method of the present embodiment includes the following steps. In Step S600, in a first time period, a plurality of first driving signals are transmitted to the driving lines to drive the sensing lines to generate a plurality of first sensing signals. Moreover, the first sensing signals are received and calculated to obtain a plurality of first summation signals. In Step S610, in a second time period, a plurality of second driving signals are transmitted to the driving lines to drive the sensing lines to generate a plurality of second sensing signals. In addition, the second sensing signals are received and calculated to obtain a plurality of second summation signals. In Step S620, a part or all of the first summation signals is replaced with a part or all of the second summation signals, so that a summation of a signal value of a combination of the second summation signals and the first summation signals which are not replaced is smaller than a summation of a signal value of the first summation signals before recombination.

The noise detection and result optimization methods according to embodiments of the invention have been fully embodied by the description of FIG. 1 to FIG. 5, and therefore further elaboration thereof is omitted.

In view of the foregoing, in embodiments of the invention, the touch controller may repeatedly execute the noise detection method in different time periods to obtain a plurality of sets of summation signals. The touch controller uses the new summation signals to replace a part or all of the original summation signals, and thereby not only enabling rapid and accurate evaluation of a noise summation, but also the noise summation can be optimized.

It will be apparent to those skilled in the art that various modifications and variations can be made to the structure of the disclosed embodiments without departing from the scope or spirit of the invention. In view of the foregoing, it is intended that the disclosure cover modifications and variations of this specification provided they fall within the scope of the following claims and their equivalents.

What is claimed is:

1. A touch controller adapted for driving a touch panel, wherein the touch panel comprises a plurality of driving lines and a plurality of sensing lines electrically connected to the driving lines, the touch controller comprising:
   a drive circuit, wherein in a first time period, the drive circuit is configured to transmit a plurality of first driving signals to the driving lines to drive the sensing lines to generate a plurality of first sensing signals, and in a second time period, the drive circuit is configured to transmit a plurality of second driving signals to the driving lines to drive the sensing lines to generate a plurality of second sensing signals; and
   a control circuit, wherein in the first time period, the control circuit is configured to receive the first sensing signals to obtain a plurality of first summation signals respectively corresponding to the sensing lines, and in the second time period, the control circuit is configured to receive the second sensing signals to obtain at least one second summation signal respectively corresponding to at least one sensing line, wherein each of the first summation signals in the first time period and the at least one second summation signal in the second time period is a summation of data obtained by one sensing line by driving all of the driving lines, and wherein the control circuit is configured to replace a part or all of the first summation signals with the at least one second summation signal, wherein the control circuit is configured to calculate a first value by further summing signal values of a combination of the at least one second summation signal and the first summation signals which are not replaced, wherein the control circuit is configured to calculate a second value by further summing signal values of the first summation signals before replacing the part or all of the first summation signals with the at least one second summation signal, wherein, by replacing the part or all of the first summation signals with the at least one second summation signal, the first value is smaller than the second value.

2. The touch controller according to claim 1, wherein the summation of the signal value of the combination of the at least one second summation signal and the first summation signals which are not replaced is a smallest summation of the signal values of all of the combinations of the at least one second summation signal and the first summation signals which are not replaced.

3. The touch controller according to claim 1, wherein the control circuit selects one or more second summation signals from the at least one second summation signal to replace the part of the first summation signals, so as to obtain the combination of the at least one second summation signal and the first summation signals which are not replaced.

4. The touch controller according to claim 3, wherein the first summation signals which are not replaced correspond to a part of the sensing lines, and the at least one second summation signal replacing the first summation signals corresponds to the rest of the sensing lines.

5. The touch controller according to claim 3, wherein a summation of a quantity of the first summation signals which are not replaced and a quantity of the at least one second summation signal replacing the first summation signals is equal to a quantity of all of the sensing lines.

6. The touch controller according to claim 1, wherein the control circuit selects all of the at least one second summation signal to replace all of the first summation signals, so as to obtain the combination of the at least one second summation signal and the first summation signals which are not replaced.

7. The touch controller according to claim 6, wherein the at least one second summation signal replacing the first summation signals corresponds to all of the sensing lines.

8. The touch controller according to claim 6, wherein a quantity of the at least one second summation signal replacing the first summation signals is equal to all of a quantity of the sensing lines.

9. The touch controller according to claim 1, wherein a quantity of the first summation signals which are not replaced is greater than, less than, or equal to a quantity of the at least one second summation signal replacing the first summation signals.

10. The touch controller according to claim 1, wherein a time length of the first time period is longer than, shorter than, or equal to a time length of the second time period.

11. The touch controller according to claim 1, wherein each of the first driving signals has a first polarity pattern and a second polarity pattern, and in the first time period, an operation of the first polarity pattern and the second polarity pattern of each of the first driving signals is substantially equal to zero, wherein each of the second driving signals has the first polarity pattern and the second polarity pattern, and in the second time period, the operation of the first polarity pattern and the second polarity pattern of each of the second driving signals is substantially equal to zero.

12. A touch apparatus, comprising:
a touch panel comprising a plurality of driving lines and a plurality of sensing lines, the sensing lines electrically connected to the driving lines; and
a touch controller adapted for driving the touch panel, the touch controller comprising:
a drive circuit, wherein in a first time period, the drive circuit is configured to transmit a plurality of first driving signals to the driving lines to drive the sensing lines to generate a plurality of first sensing signals, and in a second time period, the drive circuit is configured to transmit a plurality of second driving signals to the driving lines to drive the sensing lines to generate a plurality of second sensing signals; and
a control circuit, wherein in the first time period, the control circuit is configured to receive the first sensing signals to obtain a plurality of first summation signals respectively corresponding to the sensing lines, and in the second time period, the control circuit is configured to receive the second sensing signals to obtain at least one second summation signal respectively corresponding to at least one sensing line, wherein each of the first summation signals in the first time period and the at least one second summation signal in the second time period is a summation of data obtained by one sensing line by driving all of the driving lines, and
wherein the control circuit is configured to replace a part or all of the first summation signals with the at least one second summation signal,
wherein the control circuit is configured to calculate a first value by further summing signal values of a combination of the at least one second summation signal and the first summation signals which are not replaced,
wherein the control circuit is configured to calculate a second value by further summing signal values of the first summation signals before replacing the part or all of the first summation signals with the at least one second summation signal,
wherein by replacing the part or all of the first summation signals with the at least one second summation signal, the first value is smaller than the second value.

13. The touch apparatus according to claim 12, wherein the summation of the signal value of the combination of the at least one second summation signal and the first summation signals which are not replaced is a smallest summation of the signal values of all of the combinations of the at least one second summation signal and the first summation signals which are not replaced.

14. The touch apparatus according to claim 12, wherein the touch controller selects one or more second summation signals from the at least one second summation signal to replace the part of the first summation signals, so as to obtain the combination of the at least one second summation signal and the first summation signals which are not replaced.

15. The touch apparatus according to claim 14, wherein the first summation signals which are not replaced correspond to a part of the sensing lines, and the at least one second summation signal replacing the first summation signals corresponds to the rest of the sensing lines.

16. The touch apparatus according to claim 14, wherein a summation of a quantity of the first summation signals which are not replaced and a quantity of the at least one second summation signal replacing the first summation signals is equal to a quantity of all of the sensing lines.

17. The touch apparatus according to claim 12, wherein the control circuit selects all of the at least one second summation signal to replace all of the first summation signals, so as to obtain the combination of the at least one second summation signal and the first summation signals which are not replaced.

18. The touch apparatus according to claim 17, wherein the at least one second summation signal replacing the first summation signals corresponds to all of the sensing lines.

19. The touch apparatus according to claim 17, wherein a quantity of the at least one second summation signal replacing the first summation signals is equal to all of a quantity of the sensing lines.

20. The touch apparatus according to claim 12, wherein a quantity of the first summation signals which are not replaced is greater than, less than, or equal to a quantity of the at least one second summation signal replacing the first summation signals.

21. The touch apparatus according to claim 12, wherein a time length of the first time period is longer than, shorter than, or equal to a time length of the second time period.

22. The touch apparatus according to claim 12, wherein each of the first driving signals has a first polarity pattern and a second polarity pattern, and in the first time period, an operation of the first polarity pattern and the second polarity pattern of each of the first driving signals is substantially equal to zero, wherein each of the second driving signals has the first polarity pattern and the second polarity pattern, and in the second time period, the operation of the first polarity pattern and the second polarity pattern of each of the second driving signals is substantially equal to zero.

23. A noise detection method of a touch panel, wherein the touch panel comprises a plurality of driving lines and a plurality of sensing lines electrically connected to the driving lines, the noise detection method comprising:

in a plurality of different time periods, respectively transmitting a plurality of sets of driving signals to the driving lines to drive the sensing lines to generate a plurality of sets of sensing signals;

in the different time periods, respectively receiving and calculating the sets of sensing signals to obtain a plurality of sets of summation signals, wherein one set of the plurality of sets of summation signals comprises a plurality of first summation signals respectively corresponding to the sensing lines, and another set of the plurality of sets of summation signals comprises at least one second summation signal respectively corresponding to at least one sensing line, wherein each of the first summation signals in the first time period and the at least one second summation signal in the second time period is a summation of data obtained by only one sensing line by driving all of the driving lines;

replacing a part or all of the first summation signals with the at least one second summation signal, so as to obtain a combination of the at least one second summation signal and the first summation signals which are not replaced;

calculating a first value by further summing signal values of the combination of the at least one second summation signal and the first summation signals which are not replaced; and, calculating a second value by further summing signal values of the first summation signals before replacing the part or all of the first summation signals with the at least one second summation signal, wherein, by replacing the part or all of the first summation signals with the at least one second summation signal, the first value is smaller than the second value.

24. The noise detection method according to claim 23, wherein the summation of the signal value of the combination of the at least one second summation signal and the first summation signals which are not replaced is a smallest summation of the signal values of all of the combinations of the at least one second summation signal and the first summation signals which are not replaced.

25. A touch controller adapted for driving a touch panel, wherein the touch panel comprises a plurality of driving lines and a plurality of sensing lines electrically connected to the driving lines, the touch controller comprising:

a drive circuit, wherein in a first time period, the drive circuit is configured to transmit a plurality of first driving signals to the driving lines to drive the sensing lines to generate a plurality of first sensing signals, and in a second time period, the drive circuit is configured to transmit a plurality of second driving signals to the driving lines to drive the sensing lines to generate a plurality of second sensing signals; and a control circuit, wherein in the first time period, the control circuit is configured to receive the first sensing signals to obtain a plurality of first summation signals respectively corresponding to the sensing lines, and in the second time period, the control circuit is configured to receive the second sensing signals to obtain at least one second summation signal the sensing lines, wherein each of the first summation signals in the first time period and the at least one second summation signal in the second time period is a summation of data obtained by one sensing line by driving all of the driving lines, and wherein the control circuit is configured to detect a noise condition according to either or both of a first summing result and a second summing result, wherein the first summing result is obtained by summing at least two of the first summation signals and the second summing result is obtained by summing at least two of the second summation signals.

26. A touch controller adapted for driving a touch panel, wherein the touch panel comprises a plurality of driving lines and a plurality of sensing lines electrically connected to the driving lines, the touch controller comprising:

a drive circuit, configured to drive the driving lines one or more times, wherein in each of a plurality of time periods, the drive circuit is configured to transmit a plurality of driving signals to the driving lines to drive the sensing lines to generate a plurality of sensing signals; and a control circuit, wherein in each of the time periods, the control circuit is configured to receive the sensing signals to obtain a respective plurality of summation signals respectively corresponding to the sensing lines, wherein each of the summation signals is a summation of data obtained by one sensing line by driving all of the driving lines, and wherein the control circuit is configured to detect a noise condition according to one or more summing results of the one or more time periods, wherein each of the one or more summing results is obtained by summing at least two of the respective summation signals in one of the one or more time periods.

* * * * *